United States Patent
Katayama

(10) Patent No.: US 10,585,818 B2
(45) Date of Patent: Mar. 10, 2020

(54) LOW OVERHEAD EXCLUSIVE CONTROL FOR SHARED MEMORY OBJECTS

(71) Applicant: INTERNATIONAL BUSINESS MACHINES CORPORATION, Armonk, NY (US)

(72) Inventor: Yasunao Katayama, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 79 days.

(21) Appl. No.: 15/480,027

(22) Filed: Apr. 5, 2017

(65) Prior Publication Data

US 2018/0293186 A1 Oct. 11, 2018

(51) Int. Cl.
*G06F 13/16* (2006.01)
*G06F 13/28* (2006.01)
*G06F 13/42* (2006.01)
*G06F 9/52* (2006.01)

(52) U.S. Cl.
CPC .......... *G06F 13/1668* (2013.01); *G06F 9/52* (2013.01); *G06F 13/1642* (2013.01); *G06F 13/1663* (2013.01); *G06F 13/28* (2013.01); *G06F 13/42* (2013.01)

(58) Field of Classification Search
CPC .................................................. G06F 13/1668
See application file for complete search history.

(56) References Cited

U.S. PATENT DOCUMENTS

| | | | |
|---|---|---|---|
| 4,974,169 A | 11/1990 | Engel | |
| 5,515,477 A | 5/1996 | Sutherland | |
| 5,612,865 A * | 3/1997 | Dasgupta | G06F 9/52 700/79 |
| 6,295,571 B1 * | 9/2001 | Scardamalia | G06F 13/1663 710/308 |
| 6,512,757 B1 | 1/2003 | Niegel et al. | |
| 6,654,730 B1 | 11/2003 | Kato et al. | |

(Continued)

OTHER PUBLICATIONS

Neil et al., "Minituar, an Event-Driven FPGA-Based Spiking Network Accelerator," IEEE Transactions on Very Large Scale Integration (VLSI) Systems, Dec. 2014, pp. 2621-2628, 22, 12.

(Continued)

*Primary Examiner* — Esther B. Henderson
(74) *Attorney, Agent, or Firm* — Tutunjian & Bitetto, P.C.; Vazken Alexanian

(57) ABSTRACT

A computer-implemented method is provided for exclusive control of shared memory objects. The method computer-implemented includes transmitting and performing a plurality of accesses to the shared memory objects from local and remote locations via read requests and write requests made to a memory, and controlling the read and write requests by a memory controller including a read queue, a write queue, and a lock address list. The computer-implemented method further includes initiating each read request to the memory via the memory controller whatever the corresponding lock bit is, initiating each write request to the memory from the recently read location via the memory controller when the corresponding lock bit is enabled, otherwise notify the requesting local or remote locations as incomplete, and enabling and disabling the corresponding lock bit after the initiation of the read and write requests to the memory, respectively.

6 Claims, 9 Drawing Sheets

(56) References Cited

U.S. PATENT DOCUMENTS

| | | |
|---|---|---|
| 6,879,518 B1 | 4/2005 | Curry |
| 7,334,100 B2* | 2/2008 | Kobayashi ............ G06F 3/0611 |
| | | 711/161 |
| 7,571,270 B1* | 8/2009 | Nemirovsky ........... G06F 9/524 |
| | | 710/200 |
| 7,583,588 B2 | 9/2009 | Bowes et al. |
| 8,098,255 B2 | 1/2012 | Fouladi et al. |
| 8,145,817 B2 | 3/2012 | Detlefs et al. |
| 2003/0093524 A1 | 5/2003 | Goldick |
| 2003/0126200 A1 | 7/2003 | Wolff |
| 2004/0117563 A1* | 6/2004 | Wu ........................ G06F 9/52 |
| | | 711/150 |
| 2005/0235134 A1 | 10/2005 | O'Sullivan |
| 2006/0212573 A1 | 9/2006 | Loaiza et al. |
| 2006/0218556 A1 | 9/2006 | Nemirovsky et al. |
| 2007/0294496 A1 | 12/2007 | Goss et al. |
| 2008/0319933 A1 | 12/2008 | Moussa et al. |
| 2009/0106495 A1 | 4/2009 | Chou |
| 2009/0240860 A1* | 9/2009 | Coon ...................... G06F 9/526 |
| | | 710/200 |
| 2011/0106741 A1 | 5/2011 | Denneau et al. |
| 2012/0036329 A1 | 2/2012 | Coon et al. |
| 2012/0221671 A1* | 8/2012 | Chen ..................... G06F 15/167 |
| | | 709/213 |
| 2013/0191838 A1 | 7/2013 | Hoffman et al. |
| 2013/0254510 A1 | 9/2013 | Brehmer et al. |
| 2015/0106314 A1 | 4/2015 | Birdwell et al. |
| 2015/0186057 A1 | 7/2015 | Das Sharma et al. |
| 2016/0283303 A1 | 9/2016 | Sharma et al. |
| 2016/0364644 A1 | 12/2016 | Brothers et al. |

OTHER PUBLICATIONS

Office Action with cited art in corresponding U.S. Appl. No. 15/141,264 dated Jan. 11, 2019, 29 pages.

Notice of Allowance with cited art in corresponding U.S. Appl. No. 15/281,239 dated Aug. 28, 2018.

Coates et al., "Deep learning with COTS HPC systems", Proceedings of the 30th International Conference on Machine Learning, JMLR: W&CP, vol. 28. Jun. 16-21, 2013. pp. 1-9.

Culler et al., "LogP: Towards a Realistic Model of Parallel Computation", Proceedings of the Fourth ACMSIGPLAN Symposium on Principles and Practice of Parallel Programming, May 19-22, 1993. pp. 1-24.

U.S. Office Action issued in U.S. Appl. No. 15/141,264 dated Jun. 13, 2019, 27 pages.

* cited by examiner

LOW OVERHEAD EXCLUSIVE CONTROL FOR SHARED MEMORY OBJECTS

RELATED APPLICATION INFORMATION

This application is related to the subject matter of commonly assigned, co-pending U.S. application Ser. No. 15/141,264 filed Apr. 28, 2016 and U.S. application Ser. No. 15/281,239 filed Sep. 30, 2016.

BACKGROUND

Technical Field

The present invention relates generally to computing systems, and more specifically, to systems and methods for synchronizing and processing of memory access operations in such computing systems where multiple processor units and input/output units share data structures in a memory for exclusive control of shared memory objects.

Description of the Related Art

In high-performance computer systems, a plurality of central processor units (CPUs) are typically operated in a parallel fashion in conjunction with other system units, including several input/output (I/O) units, by providing all system units with relatively autonomous accessibility to a common system memory (e.g., the primary or main memory). These system units are capable of both reading from and writing to locations within the main memory. Because the system units share data structures in main memory and because memory access requests originating from these units are asynchronous in nature, memory access conflicts arise when access to identical locations in memory is requested by different system units at the same time. Accordingly, access to main memory is controlled in such a manner that memory access requests are sequenced correctly so as to avoid access conflicts without paying too much overhead for the control.

SUMMARY

In accordance with one embodiment, a computer-implemented method for exclusive control of shared memory objects is provided. The computer-implemented method includes transmitting and performing a plurality of accesses to the shared memory objects from local and remote locations (i.e., processor cores) via write requests and read requests made to a memory, controlling the read and write requests by a memory controller including a read queue, a write queue, and a lock address list, each slot of the lock address list associated with a lock bit, initiating each read request to the memory via the memory controller whatever the corresponding lock bit is, initiating each write request to the memory from the recently read location via the memory controller when the corresponding lock bit is enabled, otherwise notify the requesting local or remote locations as incomplete, and enabling and disabling the corresponding lock bit after the initiation of the read and write requests to the memory, respectively.

In accordance with one embodiment, a computer-implemented method for exclusive control of shared memory objects is provided. The computer-implemented method includes transmitting and performing a plurality of accesses to the shared memory objects from local and remote locations via read requests and write requests made to a memory, controlling the read and write requests by a memory controller including a read queue, a write queue, and a lock address list, each slot of the lock address list associated with a lock bit, initiating each read request to the memory via the memory controller when the corresponding lock bits are disabled, initiating each write request to the memory from the recently read location via the memory controller when the corresponding lock bits are enabled, and enabling and disabling the lock bits after the initiation of the read and write requests, respectively.

In accordance with another embodiment, a system for exclusive control of shared memory objects is provided. The system consists of single or multiple nodes, where each node includes a memory and at least one processor core in communication with the memory, wherein the computer system is configured to transmit and perform a plurality of accesses to the shared memory objects from local and remote locations via read requests and write requests made to a memory, control the read and write requests by a memory controller including a read queue, a write queue, and a lock address list, each slot of the lock address list associated with a lock bit, initiate each read request to the memory via the memory controller whatever the corresponding lock bit is, initiate each write request to the memory from the recently read location via the memory controller when the corresponding lock bit is enabled, otherwise notify the requesting local or remote locations as incomplete, and enable and disable the corresponding lock bit after the initiation of the read and write requests to the memory, respectively.

Furthermore, embodiments may take the form of a related computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The invention will provide details in the following description of preferred embodiments with reference to the following figures wherein.

Throughout the drawings, same or similar reference numerals represent the same or similar elements.

DETAILED DESCRIPTION

Embodiments in accordance with the present invention provide methods and devices for parallel computing. Parallel computing is the simultaneous use of multiple compute resources to solve a computational problem. The steps can include breaking down a problem into discrete parts that can be solved concurrently, where each part is further broken down to a series of instructions. Then, instructions from each part execute simultaneously on different processors and an overall control/coordination mechanism is employed. The computational problem should be able to be broken apart into discrete pieces of work that can be solved simultaneously, execute multiple program instructions at any moment in time, and be solved in less time with multiple compute resources than with a single compute resource.

Embodiments in accordance with the present invention provide methods and devices for handling various exclusive controls closer to the main memory to locally handle exclusive controls associated with both inter-node and intra-node accesses to the shared objects.

Figure 1:
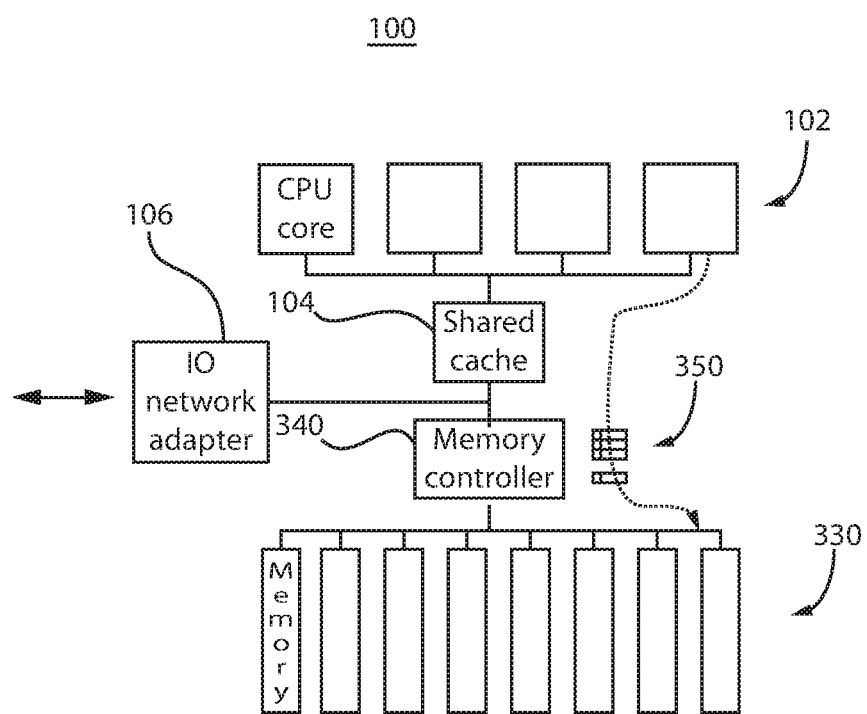
FIG. 1 is a node block/flow diagram of an exemplary computing system for exclusive control of shared memory objects, in accordance with an embodiment of the present invention.

Referring now to the drawings in which like numerals represent the same or similar elements and initially to FIG. 1, a node block/flow diagram of an exemplary computing system for exclusive control of shared memory objects is presented, in accordance with an embodiment of the present invention.

An exemplary node architecture of shared memory objects system 100 to which the present invention can be applied is shown in accordance with one embodiment. The exclusive control of shared memory objects system 100 includes at least one processor (CPU) 102 operatively coupled to other components via, e.g., a shared cache 104. An input/output (I/O) network adapter 106 and a memory controller 340 can be operatively coupled to the shared cache 104. The memory controller 340 communicates with main memory 330. The memory controller 340 includes or incorporates therein a lock address list 350. The exclusive control of shared memory objects system 100 will be described below in detail with reference to FIG. 2.

Figure 2:
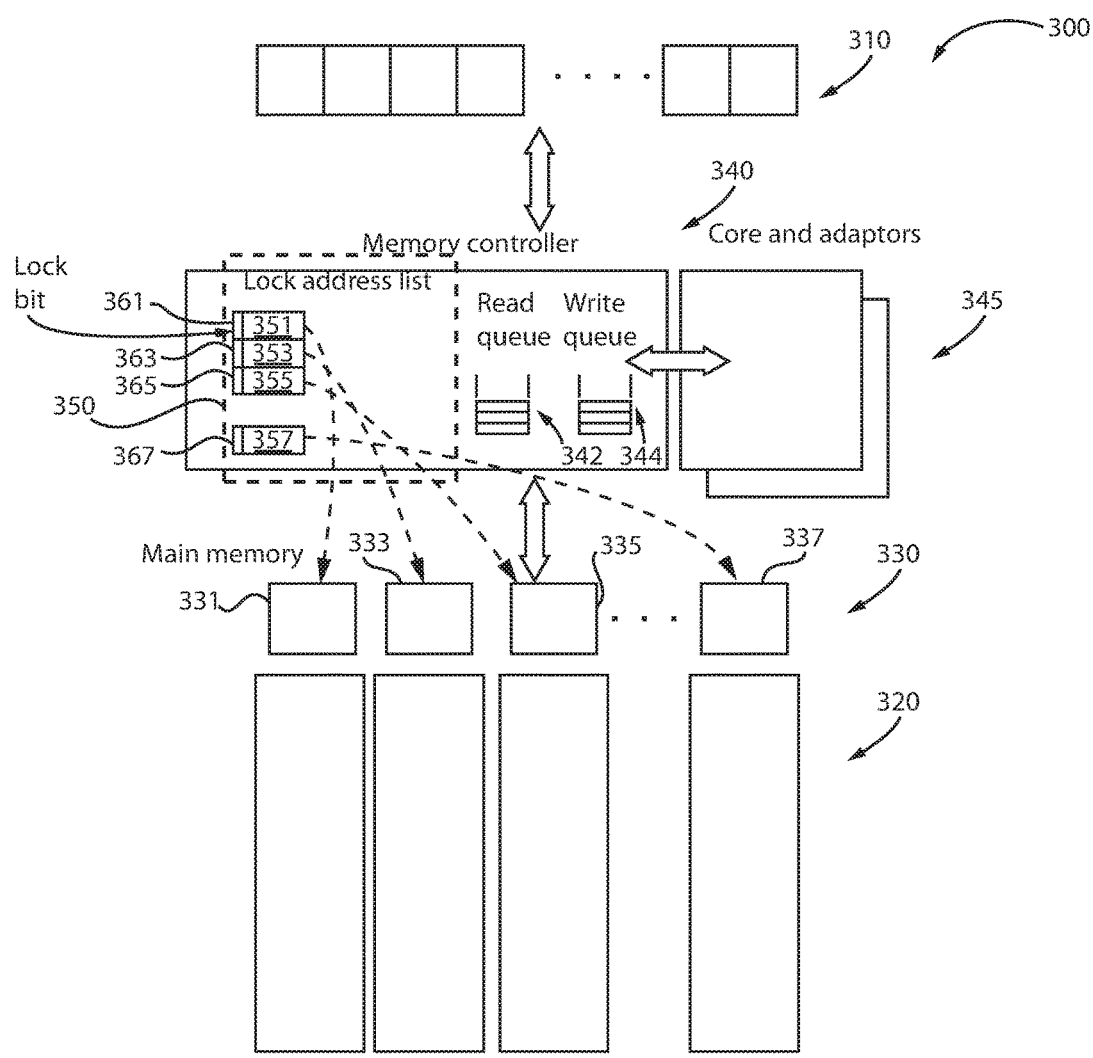
FIG. 2 is a block/flow diagram of an exemplary memory-based system using a lock address list incorporated in a memory controller, in accordance with an embodiment of the present invention.

FIG. 2 is a block/flow diagram of an exemplary memory-based system using a lock address list incorporated in a memory controller, in accordance with an embodiment of the present invention.

The memory-based system 300 includes requesting processes 310 that can be both local and remote, and local processes 320. The requesting processes 310 transmit requests to a main memory 330. The requests can be, e.g., read requests and/or write requests. The main memory 330 can contain a plurality of windows 331, 333, 335, 337 for shared memory objects. In one example, each window can be associated with a different local process.

In the instant case, the main memory 330 communicates with a memory controller 340. The memory controller 340 can communicate with system units 345. The memory controller 340 includes a read queue 342 and a write queue 344. Additionally, the memory controller 340 includes or incorporates therein a lock address list 350. The lock address list 350 includes a plurality of slots 351, 353, 355, 357. Each of the slots 351, 353, 355, 357 includes or is associated with lock bits 361, 363, 365, 367, respectively. The lock bits 361, 363, 365, 367 are mechanisms implemented in hardware or software to coordinate the activity of two or more memory access operations (initiated by system units) and ensure appropriate handshaking across multiple processes that one process has reached a suitable state such that another can proceed.

In one instance, because conflicting access operations use common memory resources, lock bits 361, 363, 365, 367 sequence the read/write requests near the common memory resources to guarantee the appropriate handshaking, and that some discipline, such as first-in-first-out (FIFO), is observed under the appropriate handshaking constraint.

When write to memory is performed, simultaneous writes from others are not blocked on requesting side, but the write requests are kept in the write queue on receiver side local to the corresponding shared memory object. When a read to memory is performed, simultaneous reads from others are not blocked on requesting side either, but the read requests are kept in the read queue local to the corresponding shared memory object. This type of sequencing allows low-latency and controlled sharing of data structures without giving rise to "race" conditions which would otherwise occur if interdependent memory access operations were to be executed without proper sequencing. Interlock mechanisms (e.g., lock address list 350) are physically implemented within the memory controller 340 by designating lock bits associated with memory locations that are required to be locked. Thus, when a read or write to a memory location is desired while precluding the possibility of having the contents of that location affected by being inappropriately accessed by another unit, a "locked" access to the desired location is achieved autonomously. This access causes a corresponding lock bit to be set appropriately for read and write. Any other memory access operation addressed to the "locked" location involves no initial testing of the corresponding lock bit prior to issuing the memory accesses.

Figure 3:
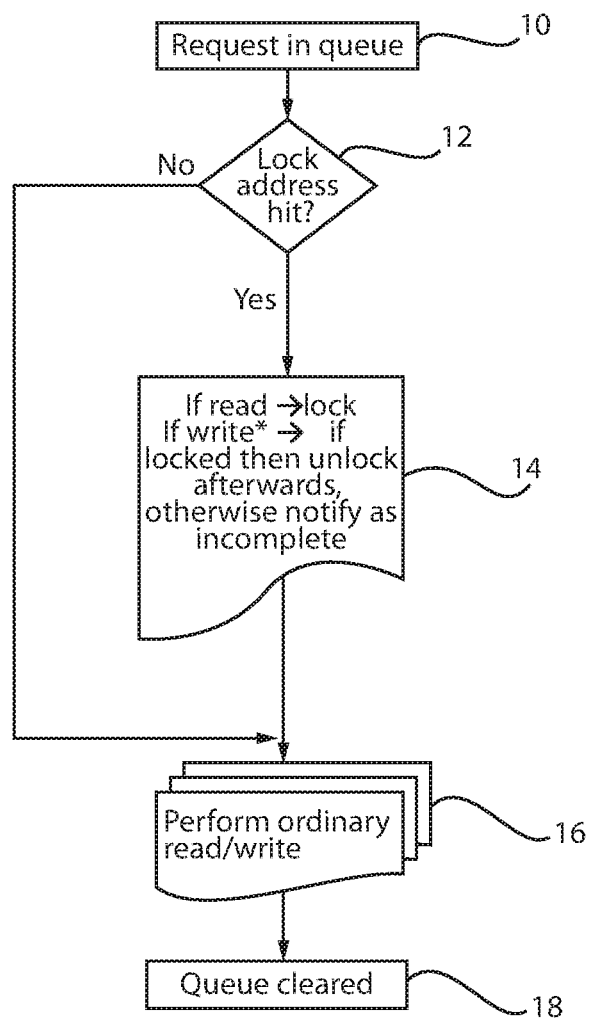
FIG. 3 is a block/flow diagram of an exemplary method for implementing the memory access control for reservation requests, in accordance with an embodiment of the present invention.

FIG. 3 is a block/flow diagram of an exemplary method for implementing the memory access control for reservation requests, in accordance with an embodiment of the present invention.

At block 10, a request is made to a queue. The queue can be, e.g., the read queue 342 or the write queue 344 shown in the memory-based system 300 of FIG. 2.

At block 12, it is determined whether the request is made to a memory location or slot in the queue that hits the lock address entry in the lock address list. If NO, then the process proceeds to block 16 where ordinary read/write operations are performed. If YES, the process proceeds to block 14.

At block 14, if a read operation is requested, the memory location is "locked." If a write operation is requested, and if the memory location is "locked," then unlock afterwards, otherwise notify as incomplete. Write means the writes are from the recently read locations (i.e., processor cores) only.

The recently read location information is assumed to have been stored in a memory controller. Other writes are either notified as incomplete or kept in wait, depending on implementation choice.

At block 16, read/write operations are performed based on the status of the lock bit.

At block 18, the queue accessed is cleared once the read or write requests are completed.

Figure 4:
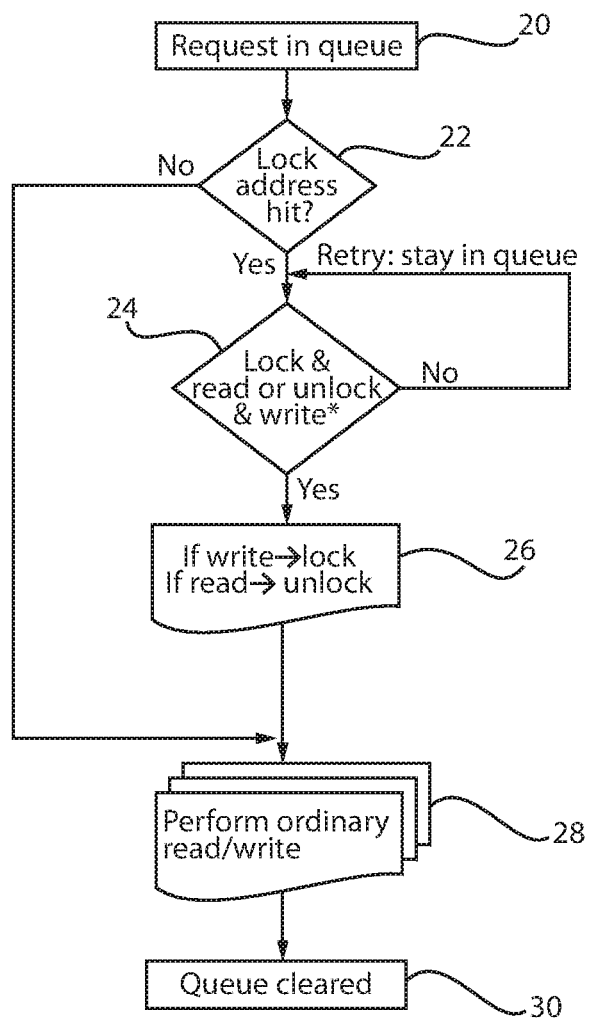
FIG. 4 is a block/flow diagram of an exemplary method for implementing the memory access control for read-modify-write (RMW) requests, in accordance with an embodiment of the present invention.

FIG. 4 is a block/flow diagram of an exemplary method for implementing the memory access control for read-modify-write (RMW) requests, in accordance with an embodiment of the present invention.

At block 20, a request is made to a queue. The queue can be, e.g., the read queue 342 or the write queue 344 shown in the memory-based system 300 of FIG. 2.

At block 22, it is determined whether the request is made to a memory location or slot in the queue that hits the lock address entry in the lock address list. If NO, then the process proceeds to block 28 where ordinary read/write operations are performed. If YES, the process proceeds to block 24.

At block 24, it is determined whether to "lock and read" or whether to "unlock and write." If YES, the process proceeds to block 26. If NO, a retry is executed. Write means the writes are from the recently read locations (i.e., processor cores) only. The recently read location information is assumed to have been stored in a memory controller. Other writes are either notified as incomplete or kept in wait, depending on implementation choice.

At block 26, if a write operation is requested, the memory location is "locked" by disabling the lock bit. If a read operation is requested, the memory location is "unlocked" by enabling the lock bit.

At block 28, read/write operations are performed based on the status of the lock bit.

At block 30, the queue accessed is cleared once the read or write requests are completed.

Figure 5:
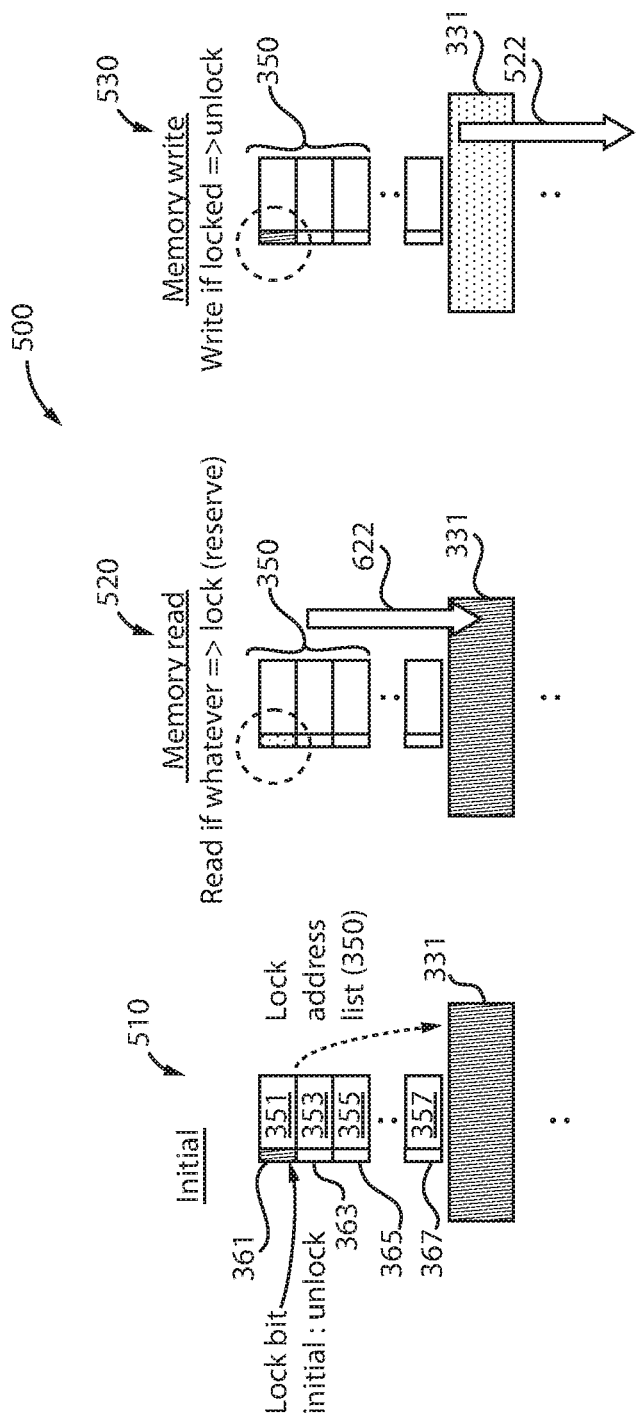
FIG. 5 is a block/flow diagram of an exemplary system demonstrating operations for exclusive control of shared memory objects regarding reservation requests, in accordance with an embodiment of the present invention.

FIG. 5 is a block/flow diagram of an exemplary system demonstrating operations for exclusive control of shared memory objects regarding reservation requests, in accordance with an embodiment of the present invention.

The system 500 demonstrates the operation for transmitting shared memory objects from a sender to a receiver. In an initial state 510, the lock address list 350 is shown including a plurality of memory locations for locked address in slots 351, 353, 355, 357. Each slot 351, 353, 355, 357 includes or is associated with a corresponding lock bit 361, 363, 365, 367. The lock address list 350 can be incorporated within the memory controller 340 (FIG. 2). A window 331 remains in an unlocked memory state, as no read/write requests have been made at this point. As such, in the initial state 510, the slots 351, 353, 355, 357 remain in an "unlocked" state.

If a memory read request 520 is made, it is determined whether the requested memory location or slot is locked or unlocked. In particular, initiate each read request to the memory whatever the corresponding bit is and the status of the slot is changed to "lock (reserve)." The transmission 522 away from the window 331 is shown.

If a memory write request 530 is made, it is determined whether the requested memory location or slot is locked or unlocked. If locked, initiate each write request to the memory only from the recently read locations(s) when the corresponding lock bit is enabled, and the status of the slot is changed to unlocked. The transmission 622 to the window 331 is shown.

Figure 6:
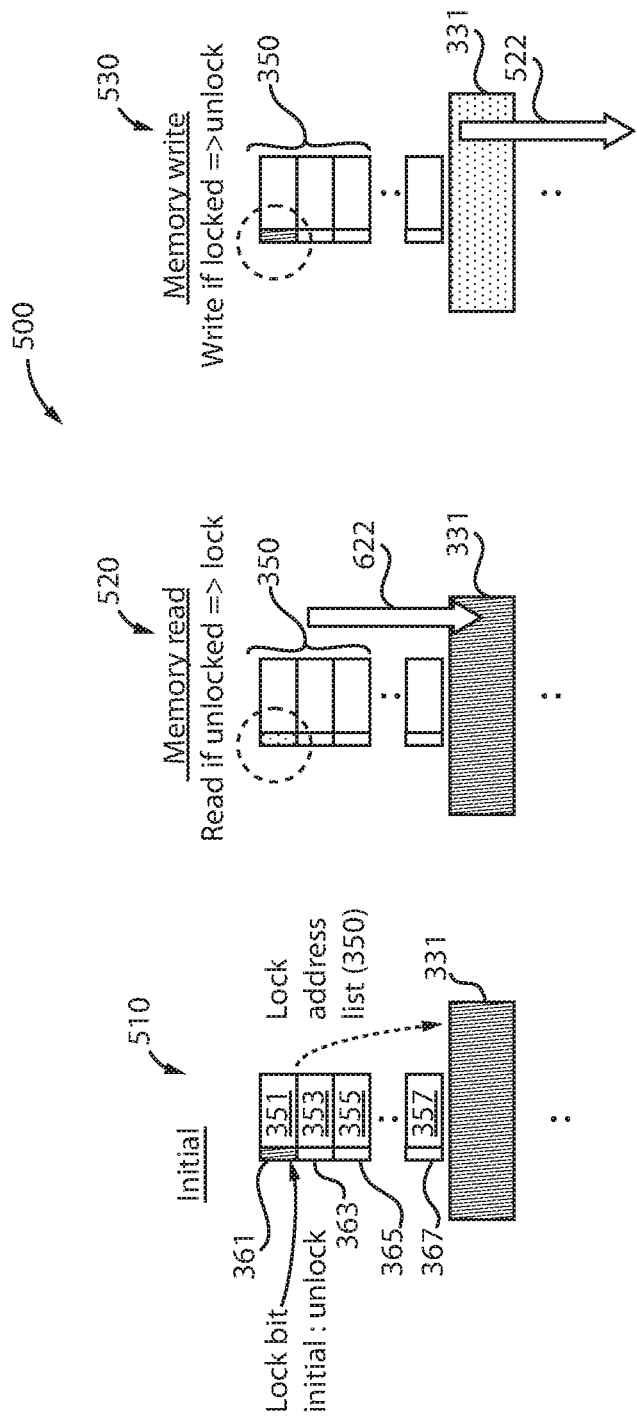
FIG. 6 is a block/flow diagram of an exemplary system demonstrating operations for exclusive control of shared memory objects regarding RMW requests, in accordance with an embodiment of the present invention.

FIG. 6 is a block/flow diagram of an exemplary system demonstrating operations for exclusive control of shared memory objects regarding RMW requests, in accordance with an embodiment of the present invention.

The system 500 demonstrates the operation for transmitting shared memory objects from a sender to a receiver. In an initial state 510, the lock address list 350 is shown including a plurality of memory locations for locked address in slots 351, 353, 355, 357. Each slot 351, 353, 355, 357 includes or is associated with a corresponding lock bit 361, 363, 365, 367. The lock address list 350 can be incorporated within the memory controller 340 (FIG. 2). A window 331 remains in an unlocked memory state, as no read/write requests have been made at this point. As such, in the initial state 510, the slots 351, 353, 355, 357 remain in an "unlocked" state.

If a memory read request 520 is made, it is determined whether the requested memory location or slot is locked or unlocked. If unlocked, the memory object is read from the requested slot and the status of the slot is changed to "lock." The transmission 522 away from the window 331 is shown.

If a memory write request 530 is made, it is determined whether the requested memory location or slot is locked or unlocked. If locked, the memory object cannot be stored in the requested slot and the status of the slot is changed to unlocked. The transmission 622 to the window 331 is shown.

Figure 7:
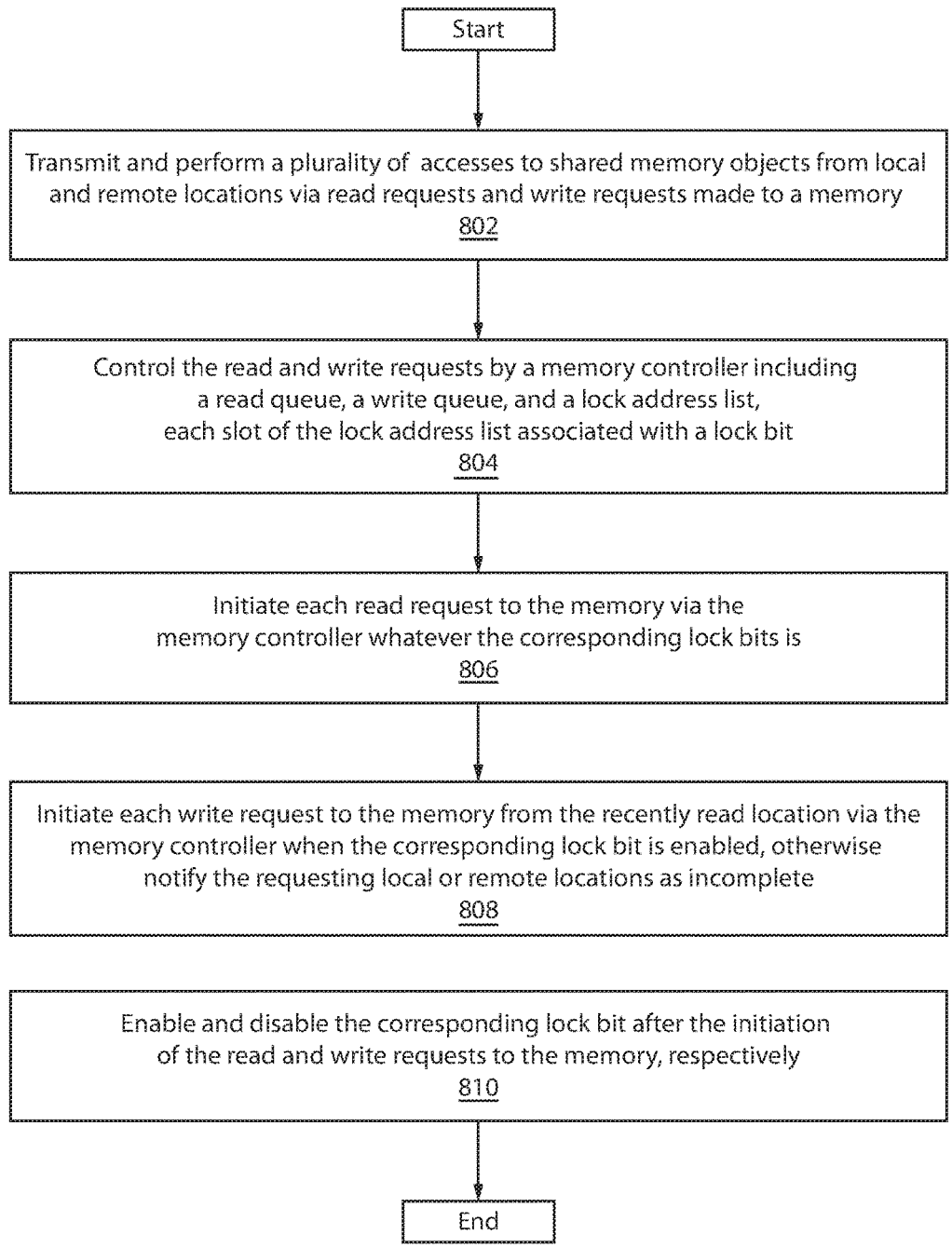
FIG. 7 is a block/flow diagram of an exemplary method for exclusive control of shared memory objects, in accordance with an embodiment of the present invention.

FIG. 7 is a block/flow diagram of an exemplary method for exclusive control of shared memory objects, in accordance with an embodiment of the present invention.

At block 802, transmit and perform a plurality of accesses to shared memory objects from local and remote locations via read requests and write requests made to a memory.

At block 804, control the read and write requests by a memory controller including a read queue, a write queue, and a lock address list, each slot of the lock address list associated with a lock bit.

At block 806, initiate each read request to the memory via the memory controller whatever the corresponding lock bit is.

At block 808, initiate each write request to the memory from the recently read location via the memory controller when the corresponding lock bit is enabled, otherwise notify the requesting local or remote locations as incomplete.

At block 810, enable and disable the corresponding lock bit after the initiation of the read and write requests to the memory, respectively.

Figure 8:
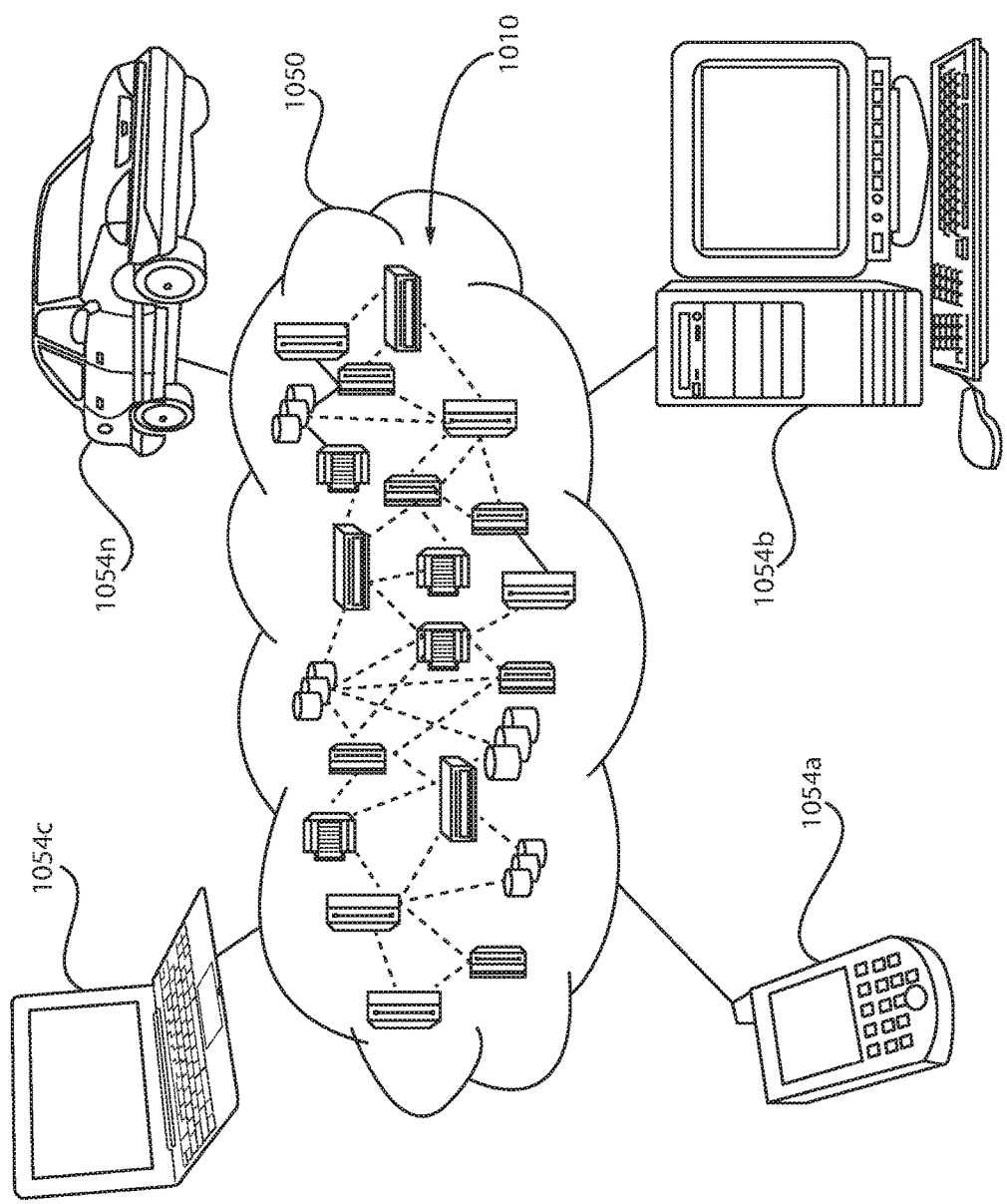
FIG. 8 is a block/flow diagram of an exemplary cloud computing environment, in accordance with an embodiment of the present invention.

FIG. 8 is a block/flow diagram of an exemplary cloud computing environment, in accordance with an embodiment of the present invention.

It is to be understood that although this invention includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 8, illustrative cloud computing environment 1050 is depicted for enabling use cases of the present invention. As shown, cloud computing environment 1050 includes one or more cloud computing nodes 1010 with which local computing devices used by cloud consumers, such as, for example, personal digital assistant (PDA) or cellular telephone 1054A, desktop computer 1054B, laptop computer 1054C, and/or automobile computer system 1054N can communicate. Nodes 1010 can communicate with one another. They may be grouped (not shown) physically or virtually, in one or more networks, such as Private, Community, Public, or Hybrid clouds as described hereinabove, or a combination thereof. This allows cloud computing environment 1050 to offer infrastructure, platforms and/or software as services for which a cloud consumer does not need to maintain resources on a local computing device. It is understood that the types of computing devices 1054A-N shown in FIG. 8 are intended to be illustrative only and that computing nodes 1010 and cloud computing environment 1050 can communicate with any type of computerized device over any type of network and/or network addressable connection (e.g., using a web browser).

Figure 9:
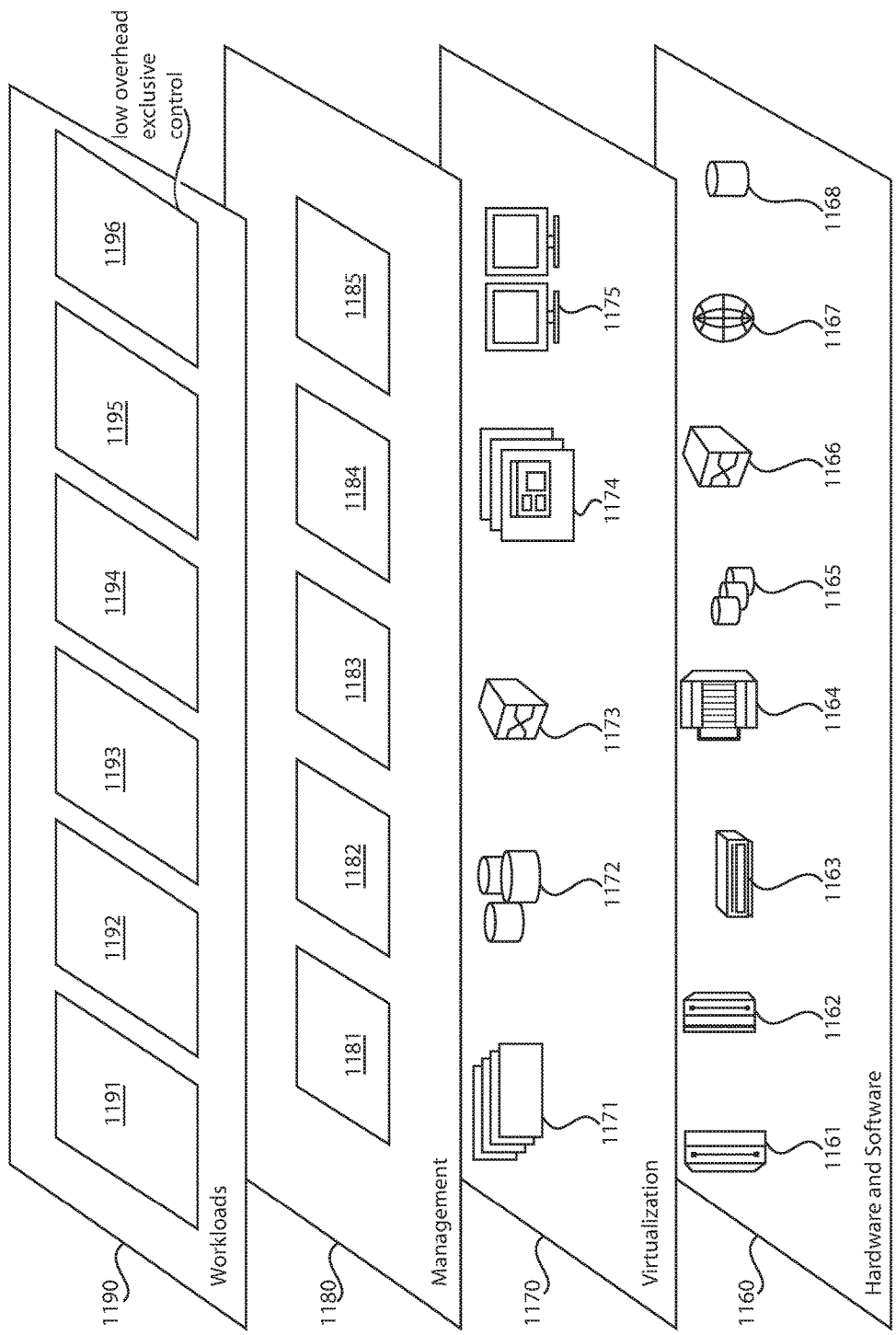
FIG. 9 is a schematic diagram of exemplary abstraction model layers, in accordance with an embodiment of the present invention.

FIG. 9 is a schematic diagram of exemplary abstraction model layers, in accordance with an embodiment of the present invention. It should be understood in advance that the components, layers, and functions shown in FIG. 9 are intended to be illustrative only and embodiments of the invention are not limited thereto. As depicted, the following layers and corresponding functions are provided:

Hardware and software layer 1160 includes hardware and software components. Examples of hardware components include: mainframes 1161; RISC (Reduced Instruction Set Computer) architecture based servers 1162; servers 1163; blade servers 1164; storage devices 1165; and networks and networking components 1166. In some embodiments, software components include network application server software 1167 and database software 1168.

Virtualization layer 1170 provides an abstraction layer from which the following examples of virtual entities can be provided: virtual servers 1171; virtual storage 1172; virtual networks 1173, including virtual private networks; virtual applications and operating systems 1174; and virtual clients 1175.

In one example, management layer 1180 can provide the functions described below. Resource provisioning 1181 provides dynamic procurement of computing resources and other resources that are utilized to perform tasks within the cloud computing environment. Metering and Pricing 1182 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1183 provides access to the cloud computing environment for consumers and system administrators. Service level management 1184 provides cloud computing resource allocation and management such that required service levels are met. Service Level Agreement (SLA) planning and fulfillment 1185 provide pre-arrangement for, and procurement of, cloud computing resources for which a future requirement is anticipated in accordance with an SLA.

Workloads layer 1190 provides examples of functionality for which the cloud computing environment may be utilized. Examples of workloads and functions which may be provided from this layer include: mapping and navigation 1191; software development and lifecycle management 1192; virtual classroom education delivery 1193; data analytics processing 1194; transaction processing 1195; and exclusive control of shared memory objects 1196.

Still yet, any of the components of the present invention could be created, integrated, hosted, maintained, deployed, managed, serviced, etc. by a service supplier who offers to provide a method for exclusive control of shared memory objects. Thus, the present invention describes a process for deploying, creating, integrating, hosting, maintaining, and/or integrating computing infrastructure, including integrating computer-readable code into the exclusive control of shared memory objects system 100 (FIG. 1), wherein the code in combination with the exclusive control of shared memory objects system 100 is capable of performing a method for exclusive control of shared memory objects. In another embodiment, the invention provides a business method that performs the process blocks/steps of the invention on a subscription, advertising, and/or fee basis. That is, a service supplier, such as a Solution Integrator, could offer to provide a method for exclusive control of shared memory objects. In this case, the service supplier can create, maintain, support, etc. a computer infrastructure that performs the process blocks/steps of the invention for one or more customers. In return, the service supplier can receive payment from the customer(s) under a subscription and/or fee agreement and/or the service supplier can receive payment from the sale of advertising content to one or more third parties.

The descriptions of the various embodiments of the present invention have been presented for purposes of illustration, but are not intended to be exhaustive or limited to the embodiments described. Many modifications and variations will be apparent to those of ordinary skills in the art without departing from the scope and spirit of the described embodiments. The terminology used herein was chosen to best explain the one or more embodiments, the practical application or technical improvement over technologies found in the marketplace, or to enable others of ordinary skills in the art to understand the embodiments described herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to at least one processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational blocks/steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method for synchronizing and processing of memory access operations for exclusive control of shared memory objects (which are intended to be illustrative and not limiting), it is noted that modifications and variations can be made by persons skilled in the art in light of the above teachings. It is therefore to be understood that changes may be made in the particular embodiments described which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer system for exclusive control of shared memory objects, each node of the computer system comprising:
   a memory; and
   at least one processor in communication with the memory, wherein the computer system is configured to:
   transmit and perform a plurality of accesses to the shared memory objects from local and remote locations via read requests and write requests made to a memory;
   control the read and write requests by a memory controller incorporating therein a read queue, a write queue, and a lock address list, each slot of the lock address list associated with a lock bit;
   initiate each read request to the memory via the memory controller whatever the corresponding lock bit is and change status of corresponding slot to lock (reserve);
   initiate each write request to the memory from a recently read location via the memory controller when the corresponding lock bit is enabled, otherwise notify the requesting local or remote locations as incomplete, and change status of corresponding slot to unlocked; and
   enable the corresponding lock bit after the initiation of the read request to the memory and disable the corresponding lock bit after the initiation of the write request to the memory.

2. The computer system of claim 1, wherein exclusive access controls with states and queues are handled near the memory.

3. The computer system of claim 1, wherein the memory controller arbitrates local and remote locations more equally.

4. The computer system of claim 1, wherein read-write constraints for multiple access is handled locally.

5. The computer system of claim 1, wherein the lock bits are segmented according to the memory controller's access granularity.

6. The computer system of claim 1, wherein memory-based protocols executed by the memory controller are supported for 10 memory access architectures such as Remote Direct Memory Access (RDMA).

\* \* \* \* \*